United States Patent
Mohan

(10) Patent No.: US 10,397,526 B2
(45) Date of Patent: *Aug. 27, 2019

(54) SECURITY CAMERA WITH ADJUSTABLE LENS AIMING MECHANISM

(71) Applicant: Avigilon Corporation, Vancouver (CA)

(72) Inventor: Sudeep Mohan, Surrey (CA)

(73) Assignee: Avigilon Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,521

(22) Filed: Apr. 27, 2017

(65) Prior Publication Data
US 2017/0230623 A1  Aug. 10, 2017

Related U.S. Application Data

(63) Continuation of application No. 14/231,277, filed on Mar. 31, 2014, now Pat. No. 9,674,450.

(51) Int. Cl.
| | |
|---|---|
| *H04N 7/18* | (2006.01) |
| *G08B 15/00* | (2006.01) |
| *G03B 17/08* | (2006.01) |
| *G03B 17/56* | (2006.01) |
| *H04N 5/225* | (2006.01) |
| *H04N 5/232* | (2006.01) |
| *G08B 13/196* | (2006.01) |

(52) U.S. Cl.
CPC ............. *H04N 7/183* (2013.01); *G03B 17/08* (2013.01); *G03B 17/563* (2013.01); *G08B 13/19619* (2013.01); *G08B 15/001* (2013.01); *H04N 5/2251* (2013.01); *H04N 5/2252* (2013.01); *H04N 5/2254* (2013.01); *H04N 5/23296* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 6,249,310 B1 | 6/2001 | Lefkowitz | |
| 6,268,882 B1 * | 7/2001 | Elberbaum | G08B 13/19619 348/143 |

(Continued)

OTHER PUBLICATIONS

English translation of Office action issued by the Mexican Institute of the Industrial Property (IMPI) in connection with Mexican Patent Application No. MX/a/2015/004052.

*Primary Examiner* — Reza Aghevli
(74) *Attorney, Agent, or Firm* — Daniel Hammond

(57) ABSTRACT

A security camera with an adjustable lens aiming mechanism comprises a base with a camera seat, an eyeball camera, a cover, and a fastener for fastening the cover to the base. The eyeball camera comprises a lens and is movably seated on the camera seat. The cover covers the eyeball camera and comprises a bottom opening for engaging the base, a circular contact ring with a diameter smaller than the camera diameter and defining an opening through which the lens and a portion of the camera protrudes; and a fastener removably fastening the cover to the base such that when fully fastened, the contact ring makes contact with the camera and applies a sufficient pressure to fix the camera in place, and when partially or completely unfastened, the pressure is reduced such that the camera is movable and the lens is movable within the contact ring.

18 Claims, 18 Drawing Sheets

(56) References Cited

U.S. PATENT DOCUMENTS

| | | | | |
|---|---|---|---|---|
| 6,476,856 B1* | 11/2002 | Zantos | ............. | G08B 13/19619 |
| | | | | 348/143 |
| 6,860,654 B1* | 3/2005 | Ching-Wen | ...... | G08B 13/19619 |
| | | | | 348/143 |
| 2005/0104995 A1 | 5/2005 | Spryshak et al. | | |
| 2006/0055820 A1* | 3/2006 | Lyon | ................ | G08B 13/19619 |
| | | | | 348/373 |
| 2008/0056709 A1* | 3/2008 | Huang | ................... | G03B 37/02 |
| | | | | 396/427 |
| 2008/0231699 A1* | 9/2008 | Konishi | ................. | G03B 37/02 |
| | | | | 348/143 |
| 2009/0147127 A1* | 6/2009 | Ogawa | ................... | G03B 17/02 |
| | | | | 348/374 |
| 2012/0045197 A1* | 2/2012 | Jones | ..................... | G03B 17/02 |
| | | | | 396/427 |
| 2012/0062781 A1* | 3/2012 | Gfeller | ..................... | G03B 3/10 |
| | | | | 348/335 |
| 2014/0002676 A1* | 1/2014 | Ning | ........................ | G02B 7/14 |
| | | | | 348/187 |
| 2014/0347754 A1* | 11/2014 | Lee | .......................... | G03B 3/00 |
| | | | | 359/825 |
| 2014/0354833 A1* | 12/2014 | Takizawa | ................. | G03B 5/00 |
| | | | | 348/208.3 |
| 2014/0362242 A1* | 12/2014 | Takizawa | ................. | G03B 5/00 |
| | | | | 348/208.11 |
| 2015/0124100 A1* | 5/2015 | McRory | ................. | H04N 7/185 |
| | | | | 348/151 |
| 2015/0281650 A1 | 10/2015 | Mohan | | |

* cited by examiner

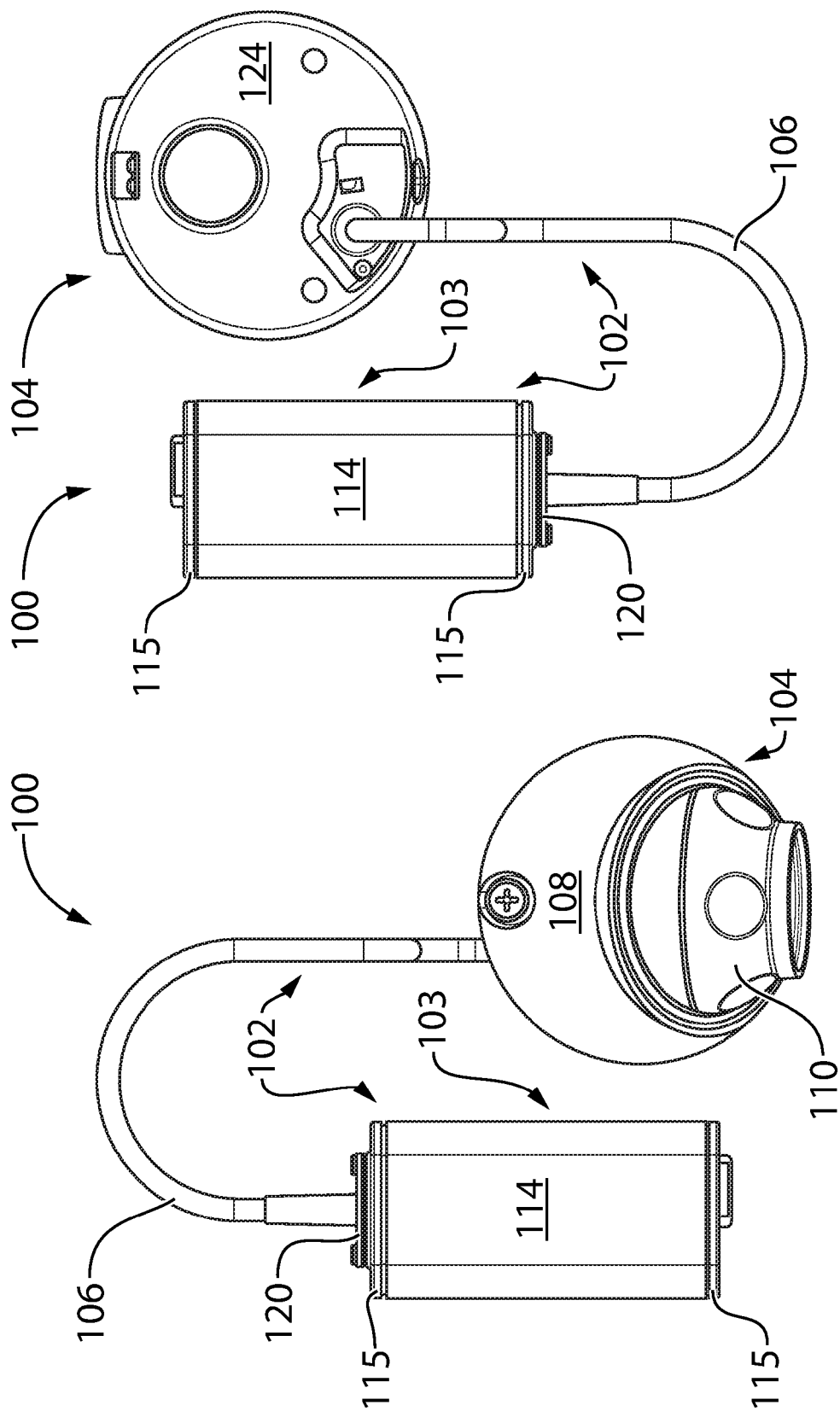

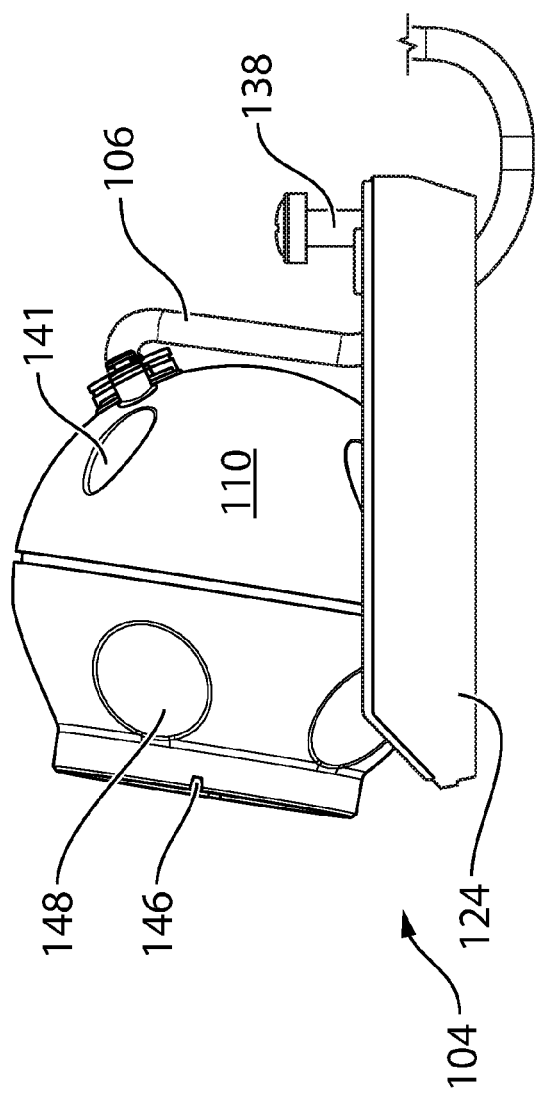
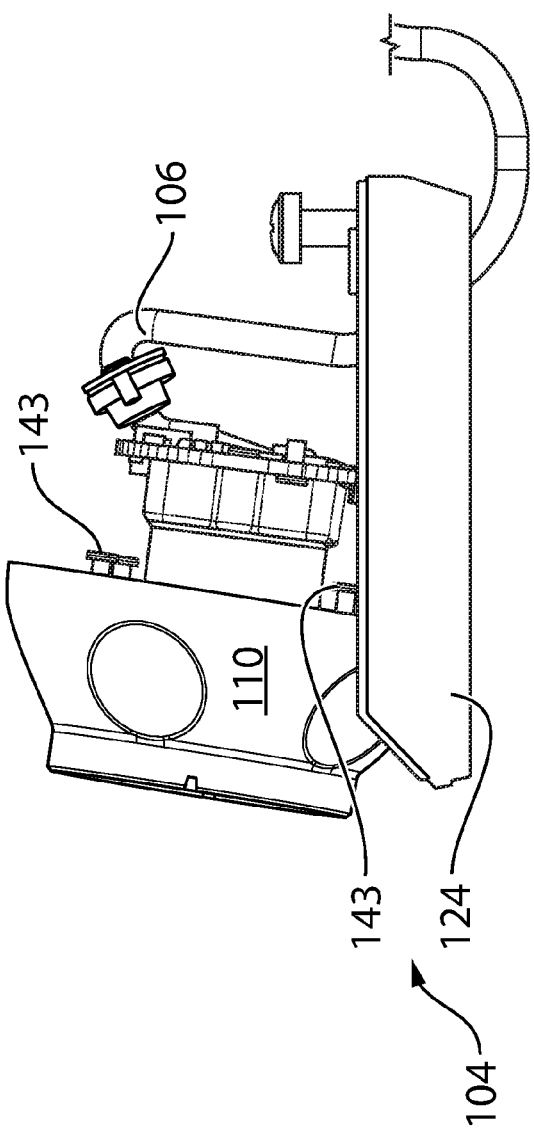
FIG. 6(b)
FIG. 6(c)

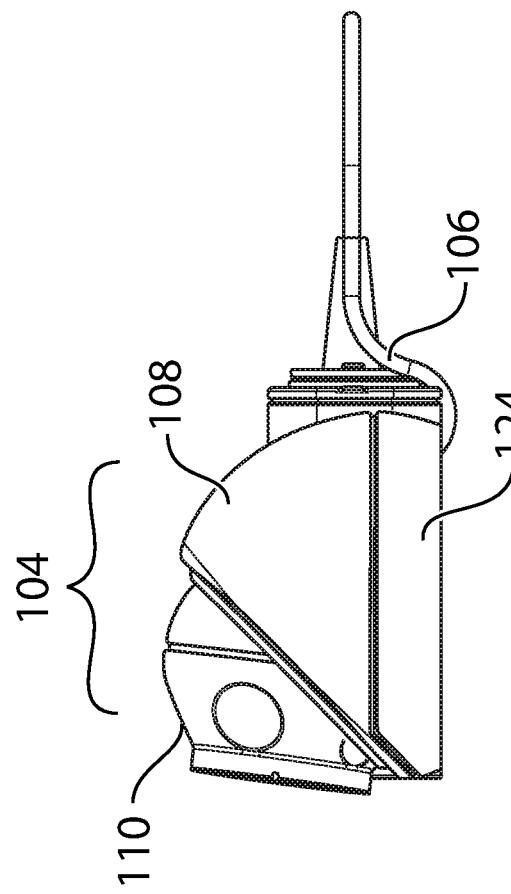
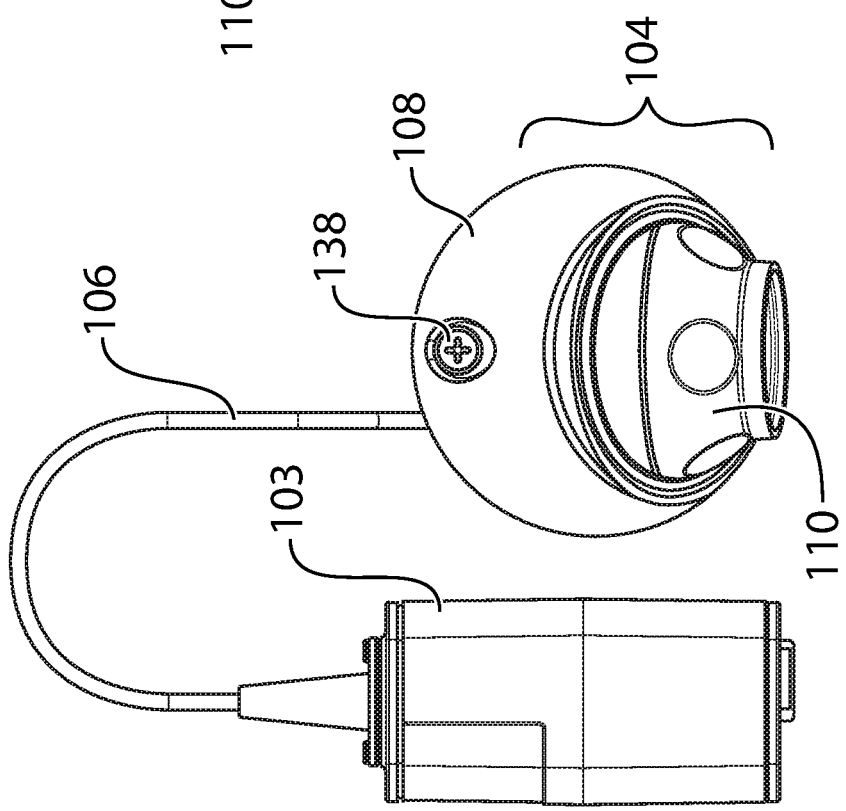
FIG. 7(b)
FIG. 7(a)

SECURITY CAMERA WITH ADJUSTABLE LENS AIMING MECHANISM

CROSS REFERENCE TO RELATED APPLICATION

This application is a Continuation of U.S. patent application Ser. No. 14/231,277, entitled SECURITY CAMERA WITH ADJUSTABLE LENS AIMING MECHANISM, filed Mar. 31, 2014, which application is incorporated by reference herein.

TECHNICAL FIELD

The present disclosure is directed at a security camera having an adjustable lens aiming mechanism.

BACKGROUND

One application of security cameras is to conduct surreptitious surveillance. To conduct surveillance surreptitiously a security camera typically needs to remain hidden from the people on whom the surveillance is being conducted. Miniaturizing a camera is one way to help it remain hidden; the smaller the camera, the more locations in which the camera may be placed to conduct the surveillance and the harder it is for the camera to be discovered. A continued focus of the security industry is accordingly miniaturizing security cameras in a manner that is not detrimental to ease of use or installation.

A challenge with miniaturizing security cameras is to maintain the functionality found in larger cameras. For example, adjusting the direction of a lens in the camera is a feature commonly found in security cameras but which presents an engineering challenge in miniaturized cameras.

A challenge to both miniaturized and larger security cameras is adjusting the direction of a lens in the camera when the camera is mounted in a difficult to access location. Conventional cameras typically require a person to carry out several steps and require careful manipulation in order to adjust the direction of the lens; such adjustments can be easily performed when the camera is readily accessible, but can be much more difficult to perform when the camera is mounted in a difficult to access location.

SUMMARY

According to a first aspect of the invention, there is provided a security camera apparatus comprising a base with a camera seat, an eyeball camera having a lens and being movably seated on the camera seat, a lens adjustment mechanism for adjusting the position of the camera lens relative to the base, and a fastener for removably fastening the lens adjustment mechanism to the base. The lens adjustment mechanism comprises a mount mountable to the base and a circular contact ring connected to the mount and having a diameter smaller than the camera diameter; this contact ring defines an opening through which the lens and a portion of the camera protrudes. The fastener removably fastens the lens adjustment mechanism to the dome base such that when fully fastened, the contact ring makes contact with the camera and applies a sufficient pressure to fix the camera in place on the seat, and when partially or completely unfastened, the pressure is reduced such that the camera is movable on the seat and the lens is movable within the contact ring.

The lens aiming mechanism can further comprise a cover which partially or wholly covers the eyeball camera, in which case the mount is a bottom opening in the cover, the contact ring is located at a front part of the cover, and the fastener is connected to the cover. The cover can comprise a lens opening and a communications port that are both sealed to impede water from entering into the camera. The cover can be a dome cover and the base can be a circular dome base.

The protruding portion of the camera can comprise markings indicating an imaging plane of camera. More particularly, the markings can be notches or protrusions on a rimmed opening encircling the lens and the indicated imaging plane can be the horizontal plane.

The protruding portion of the camera can comprise at least one finger grip. More particularly, the camera can comprise multiple finger grips including one finger grip on a protruding portion of the camera located above the lens to indicate the top of an image taken by the camera.

The camera can contain electro-optics and comprise a communications port; the apparatus in this case further comprises a processing module containing processing circuitry and a communications cable coupling the processing module to the communications port on the camera, and the dome base can further comprises a cable opening for routing the cable into the dome base. Alternatively, the dome base can contain the processing circuitry and comprise a communications port; the apparatus in this case further comprises a communications cable coupled to the communications ports of the camera and the dome base. In either case, the seat can be located in a forward portion of the dome base and the camera and dome cover are sized such that a space is provided inside the dome cover to receive a sufficient length of communications cable to allow the camera to be rotated about a defined range on the seat. Alternatively, the camera itself can contain the electro-optics and processing circuitry.

According to another aspect, there is provided a method for adjusting a camera lens position on above-reference security camera apparatus; the method comprises: partially or completely unfastening the fastener from the base such that the camera is movable on the seat and the lens is moveable within the contact ring; moving the lens to a desired position; and fully fastening the fastener to the base such that the lens adjustment mechanism applies sufficient pressure to fix the camera in place on the seat. The protruding portion of the camera can comprise markings indicating an imaging plane of camera, in which case the method further comprises moving the camera such that the markings are aligned with an imaging plane of interest. More particularly, the markings can be notches or protrusions on a rimmed opening encircling the lens and the indicated imaging plane is a horizontal plane, in which case the method further comprises moving the camera such that the indicated imaging plane is horizontally aligned with an external reference point. The protruding portion of the camera can further comprise at least one finger grip in which case the method comprises moving the lens by gripping the at least one finger grip. More particularly, the camera can comprise multiple finger grips including one finger grip on a protruding portion of the camera located above the lens to indicate the top of an image taken by the camera, in which case the method comprises moving the lens by gripping at least one of the finger grips such that the ginger grip located above the lens is vertically aligned with an external reference point.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIGS. 1(a) to (g) are perspective, front elevation, rear elevation, right side elevation, left side elevation, top plan, and bottom plan views, respectively, of a security camera apparatus having an aiming mechanism for adjusting the aim of an eyeball camera in the apparatus, according to a first embodiment.

FIG. 6(c) is a side elevation view of the eyeball camera seated in the dome base with part of camera housing removed.

FIGS. 7(a)-(f) are top plan and left side elevation views of the apparatus being manipulated to adjust the aim of the eyeball camera relative to the dome base, wherein FIGS. 7(a) and (b) show the dome cover in a loosened position, FIGS. 7(c) and (d) show the eyeball camera moved to a desired position and the dome cover in a partially tightened position, and FIGS. 7(e) and (f) show the dome cover in a fully tightened position and the eyeball camera fixed in place in the desired position.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Embodiments described herein and shown in the Figures relate to a security camera apparatus having an eyeball camera, a dome base on which the camera is seated, and a dome cover covering the eyeball camera and having an contact ring defining an opening through which a lens of the eyeball camera protrudes. The apparatus comprises an aiming mechanism which allows the aiming direction of the eyeball camera to be adjusted relative to the dome base and cover. More particularly, the dome base comprises a seat capable of seating the eyeball camera in multiple orientations, and the contact ring is sized and positioned to contact the eyeball camera and apply sufficient pressure onto the camera to fix it in place when a fastener fastening the dome cover to the base is fully tightened. The aiming direction of the eyeball camera can be changed by partially unfastening the fastener to loosen the dome cover relative to the dome base such that the eyeball camera is rotatable relative to the seat. Once the eyeball camera has been moved into a new position, the fastener is tightened until the eyeball camera is generally secured in place (relative to the dome cover and base). Such an aiming mechanism provides a relatively simple and effective way of adjusting the aiming direction of the eyeball camera, and is expected to be particularly advantageous when the apparatus is very small and/or is in a location that is difficult to access.

Figure 1A:
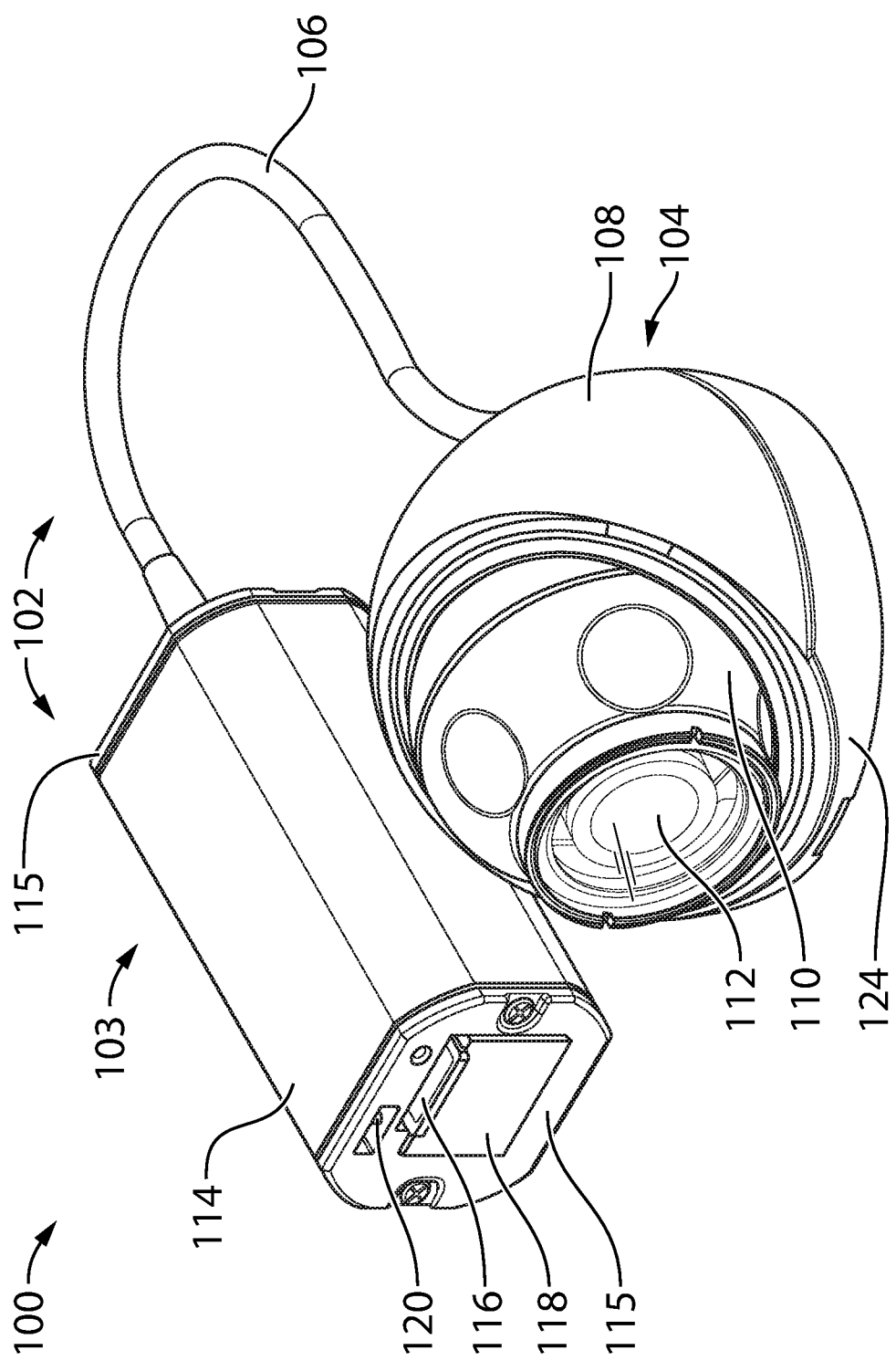
Figure 1B:
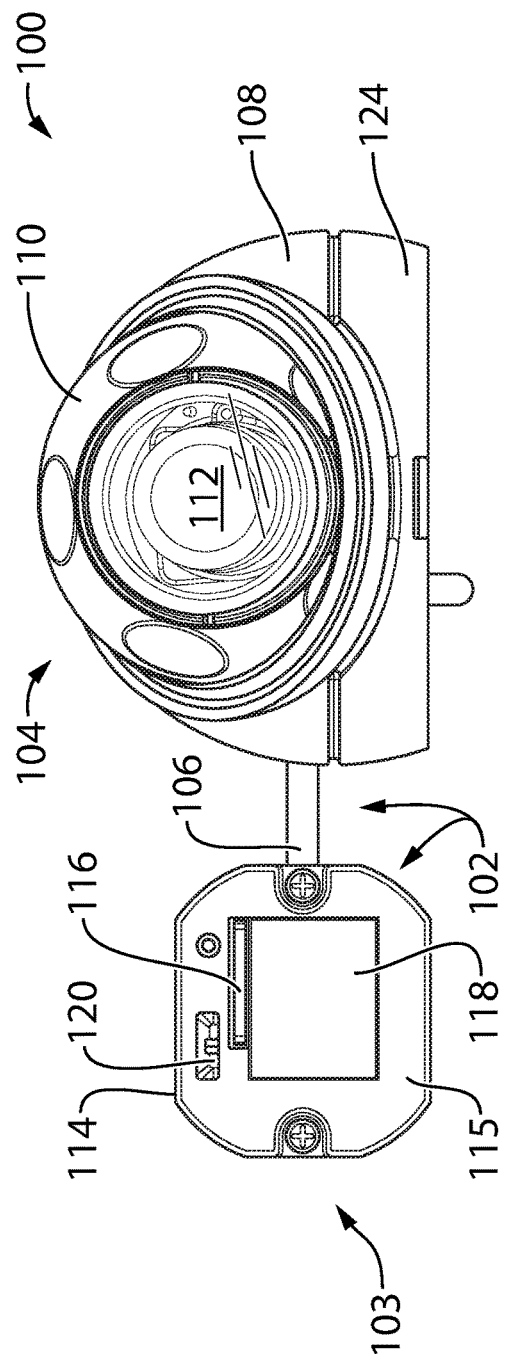
Figure 1C:
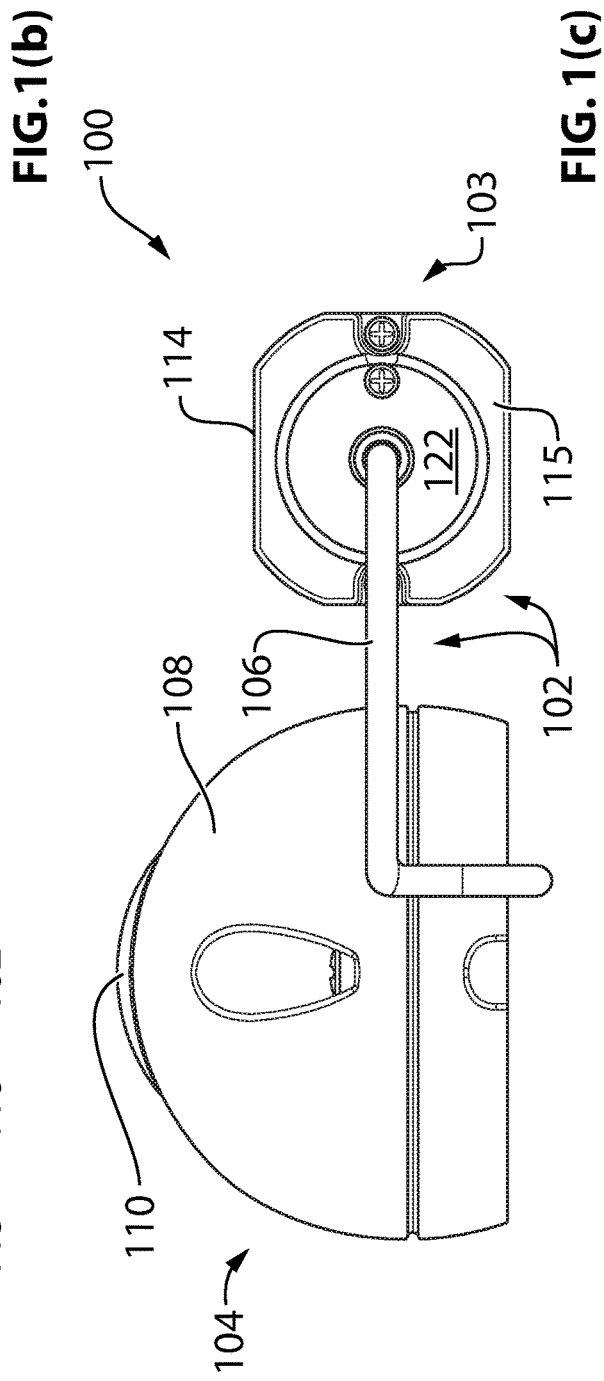
Figure 1D:
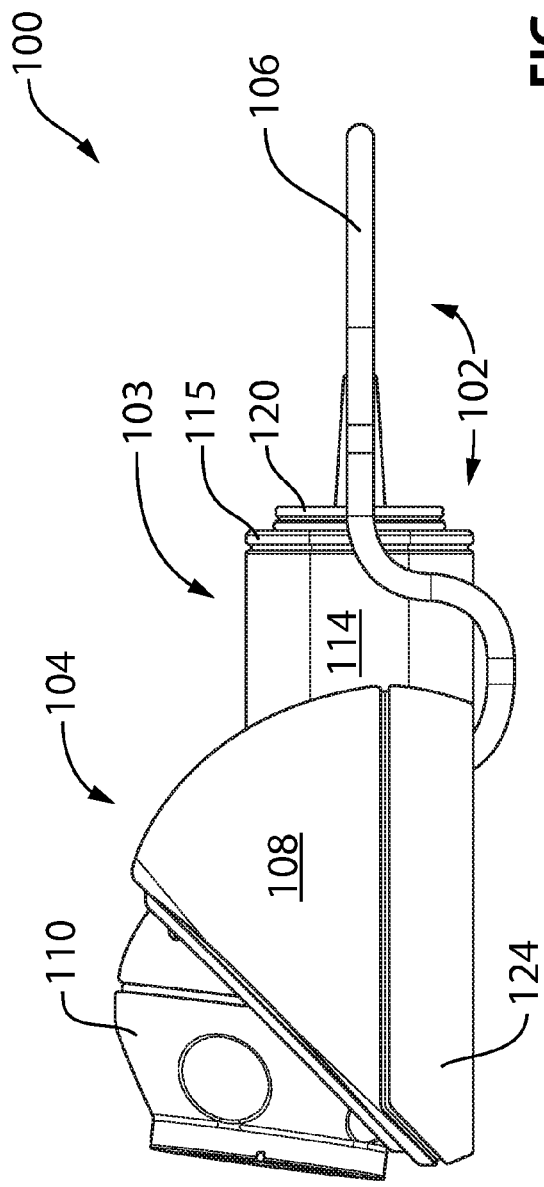
Figure 1E:
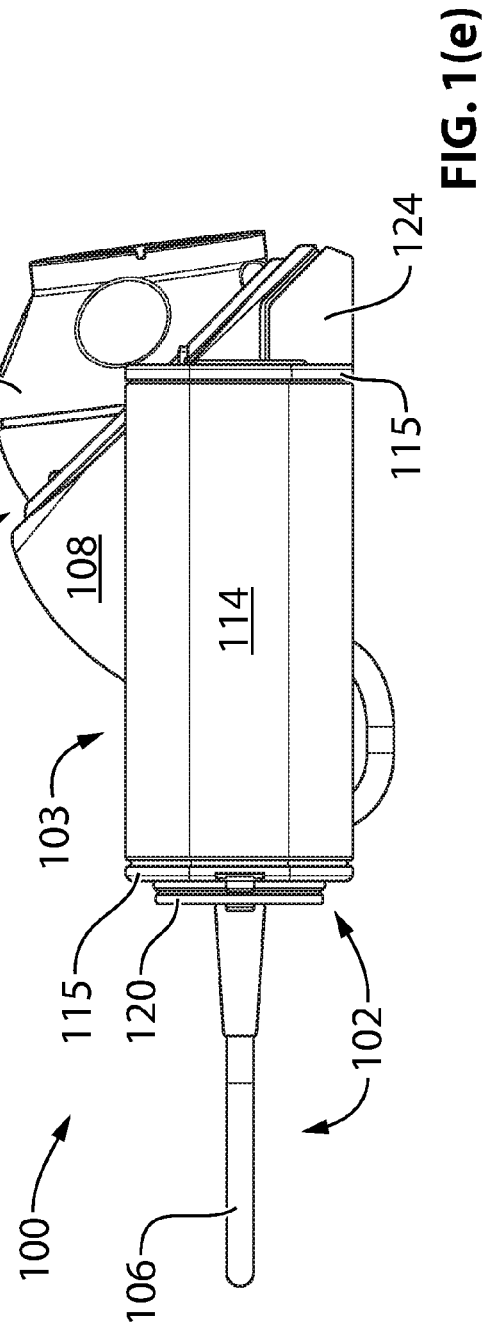
Figure 2:
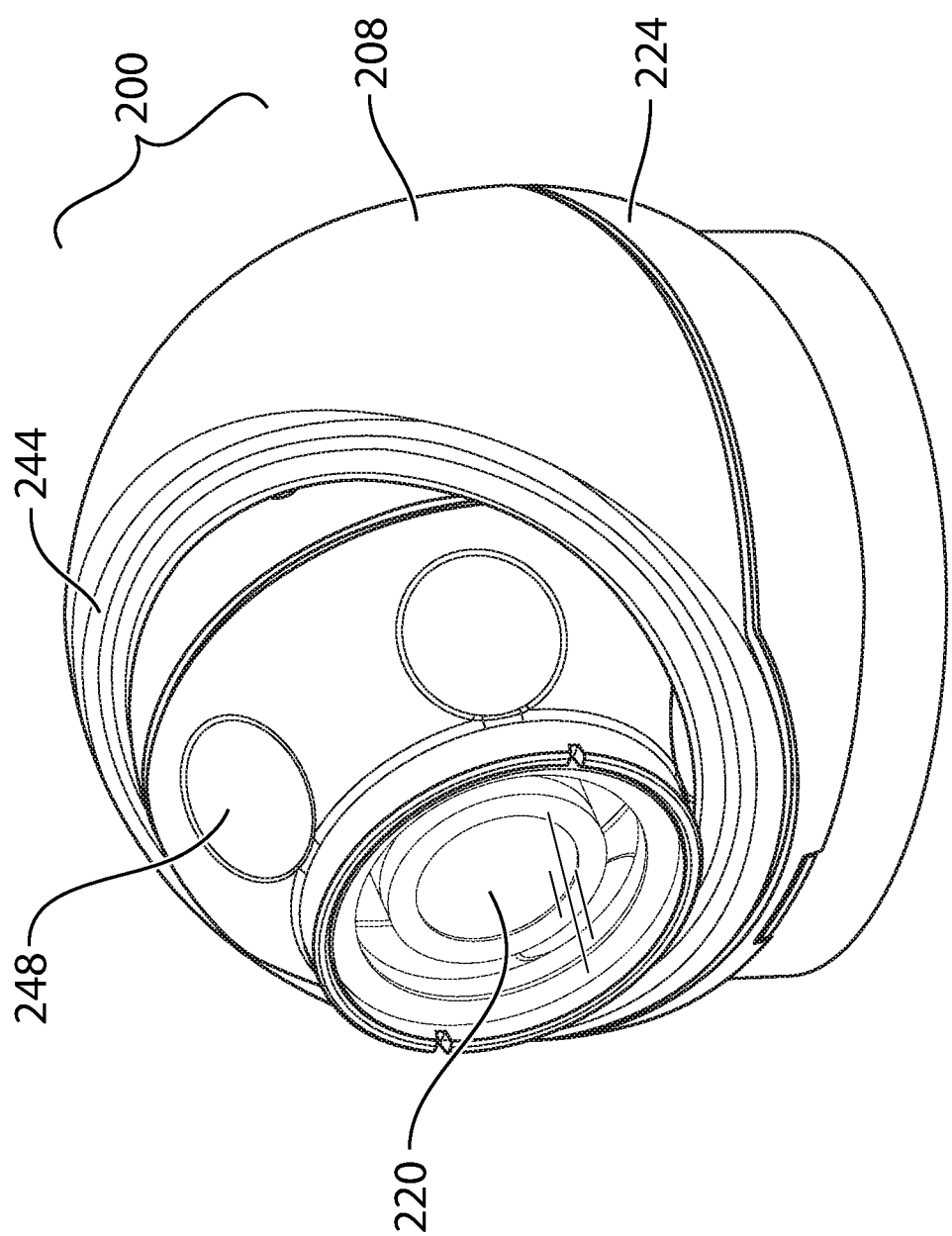
FIG. 2 is a perspective view of a security camera apparatus having an aiming mechanism for adjusting the aim of an eyeball camera in the apparatus, according to a second embodiment.

FIG. 1 illustrates a first embodiment of a security camera apparatus 100 wherein electro-optics and imaging processing circuitry are separated, with the electro-optics housed in a camera head and the processing circuitry housed in a separate processing module and connected to the camera head by a communications cable. FIG. 2 illustrates a second embodiment of a security camera 200 wherein the electro-optics and imaging processing circuitry are integrated into single unit. As will be discussed below and as shown in FIGS. 3 to 7, both embodiments 100, 200 include an aiming mechanism that enables the aim of an eyeball camera to be adjusted relative to the rest of the camera apparatus.

Referring now to FIGS. 1(a)-(g), there are shown perspective, front elevation, rear elevation, right side elevation, left side elevation, top plan, and bottom plan views, respectively, of the first embodiment of the security camera 100. This camera 100 has a camera head 104 and a cable assembly 102. The cable assembly 102 includes a processing module 103 and a communications cable 106 that connects the processing module 103 and the camera head 104. The security camera 100 depicted herein comprises an eyeball camera 110 that is mounted within a dome housing (commonly referred to as a "dome camera"); however, the camera 100 can comprise an eyeball camera 110 mounted in other types of housings.

The dome housing comprises a dome base 124 and a dome cover 108 attached to the top of the dome base 124. A front opening in the dome cover 108 allows the eyeball camera 110, which rests on the base 124, to partially protrude out the front of the dome cover 108. At the front of the eyeball camera 110 is the camera's lens 112. The lens 112 focuses light on to an image sensor 126 mounted within the eyeball camera 110. A micro-coaxial communications cable 106 connects the eyeball camera 110 to the processing module 103, which processes the video signal that the image sensor 126 outputs.

In FIGS. 1(a)-(g) only the exterior of the processing module 103 is visible. The top, bottom, left, and right sides of the processing module 103 are defined by a module housing 114, while front and rear end plates 115 cap the ends of the processing module 103. The micro-coaxial communications cable 106 is connected to the processing module 103's rear end plate 115. A waterproof grommet 122 circumscribes the end of the micro-coaxial cable 106 that terminates at the processing module 103 and is screwed into the rear end plate 115 to ensure a water tight seal. The processing module 103's front end plate 115 has a network jack such as an RJ45 (Ethernet) jack 118 to receive a plug, such as an RJ45 plug, that connects the camera 100 to the IP network. Power over Ethernet (PoE) technology may be to also power the camera 100 via the RJ45 jack. A pair of LEDs 120 indicating connection and link status and a memory card slot 116 are also present on the front end plate 115.

The processing module 103 includes a system on a chip (SoC) that comprises a processor, an image signal processor (ISP), a Media Access Controller (MAC), and an I²C interface (all not shown). The I²C interface is used to control camera parameters such as gain, exposure, and frame rate.

The SoC comprises part of the camera 100's image processing circuitry, which comprises part of and is laid out on an image processing printed circuit board (PCB) (not shown). In addition to the SoC, on the image processing PCB are a physical layer integrated circuit (PHY) that is communicative with the MAC; flash memory, which is an exemplary non-transitory computer readable medium that is non-volatile and that stores statements and instructions to cause the SoC to perform tasks such as image processing; and RAM, which is another exemplary non-transitory computer readable medium, but which is volatile and which the SoC uses to temporarily store information and for working space while performing tasks. Also located within the processing module 103 is power circuitry (not shown), which comprises part of and is laid out on a power PCB (not shown). On the power PCB is the RJ45 jack; Ethernet magnetics, which are communicative with the RJ45 jack and the PHY; and a DC to DC converter, electrically coupled to the Ethernet magnetics, that output a 3.3 V signal to power the image processing circuitry and the camera head 104. The camera 100 is powered using PoE technology, although in alternative embodiments (not depicted) the camera 100 may be powered using, for example, an AC adapter or with batteries.

While the SoC is used in the foregoing embodiments, in alternative embodiments (not depicted) the SoC may instead be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, and semiconductor based media such as flash media, random access memory, and read only memory.

Figure 3A:
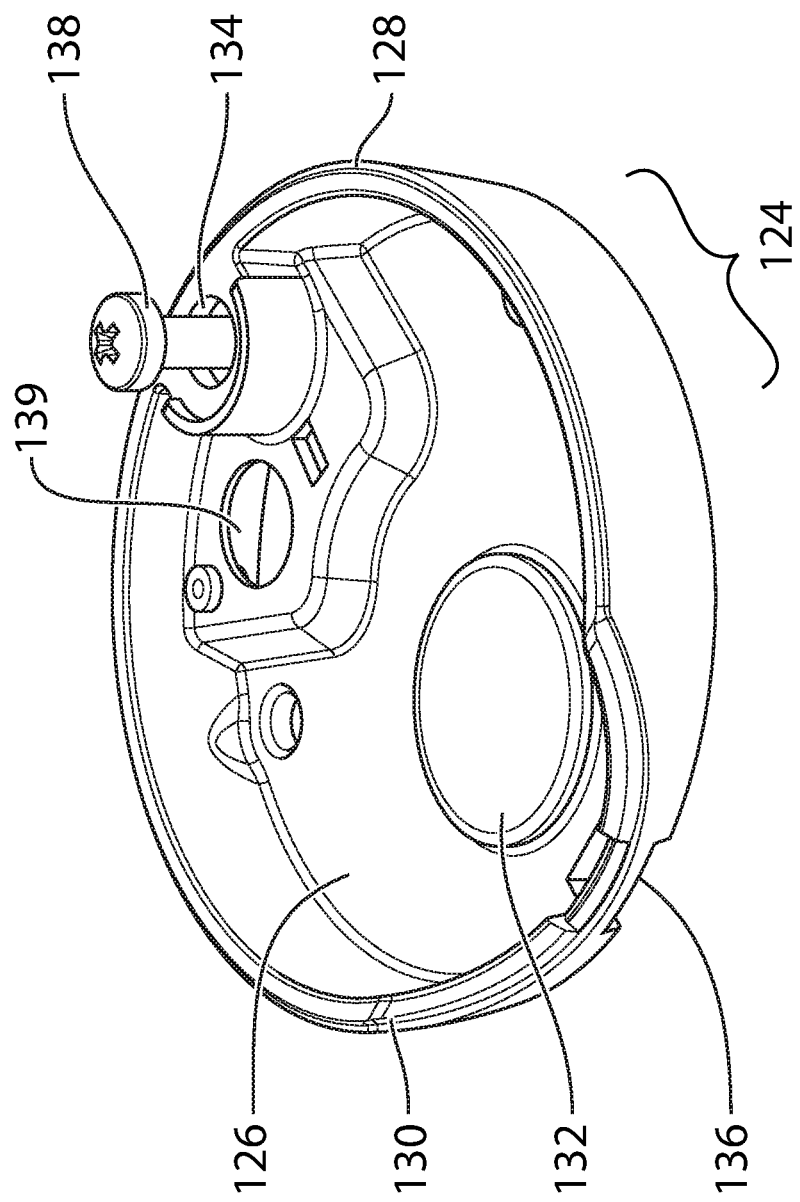
FIGS. 3(a) and (b) are respective front and rear perspective views of a dome base of the apparatus for use in both the first and second embodiments.
Figure 3B:
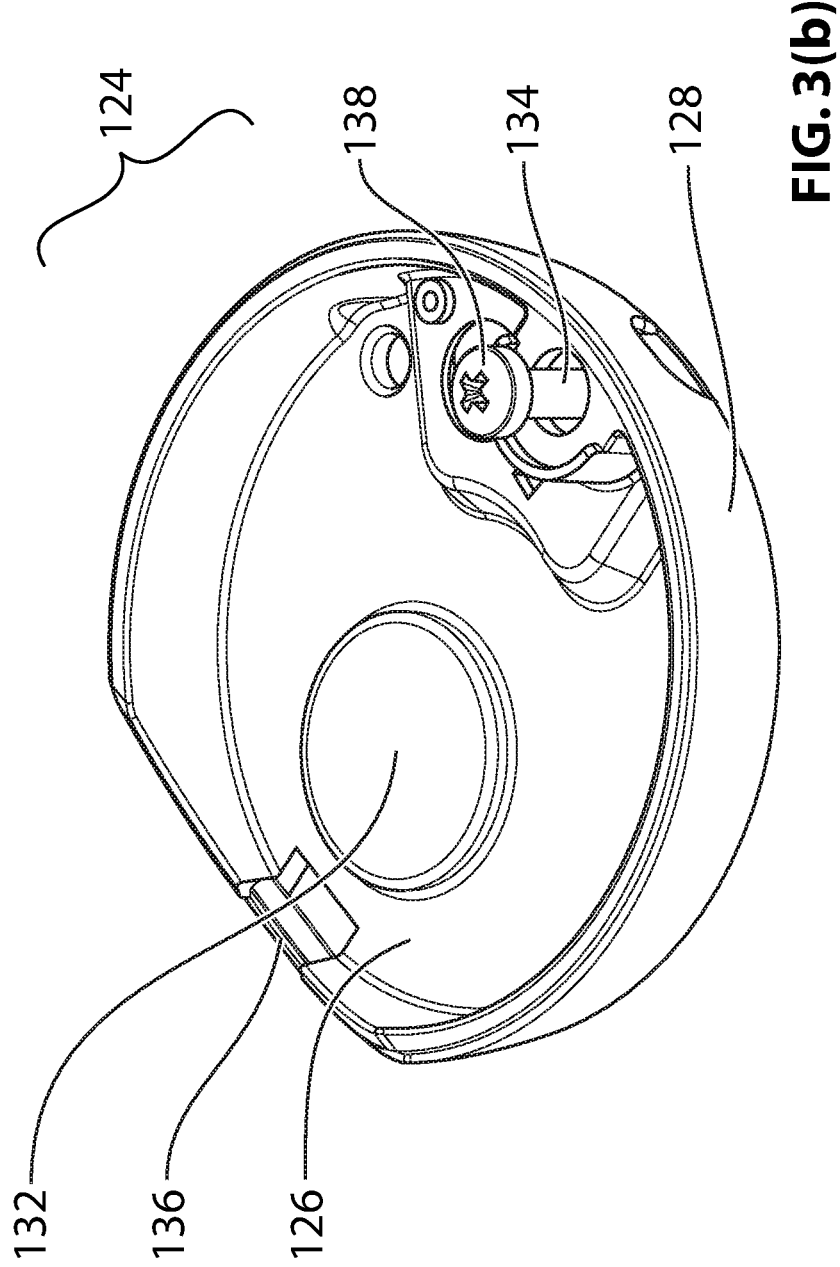
Figure 4A:
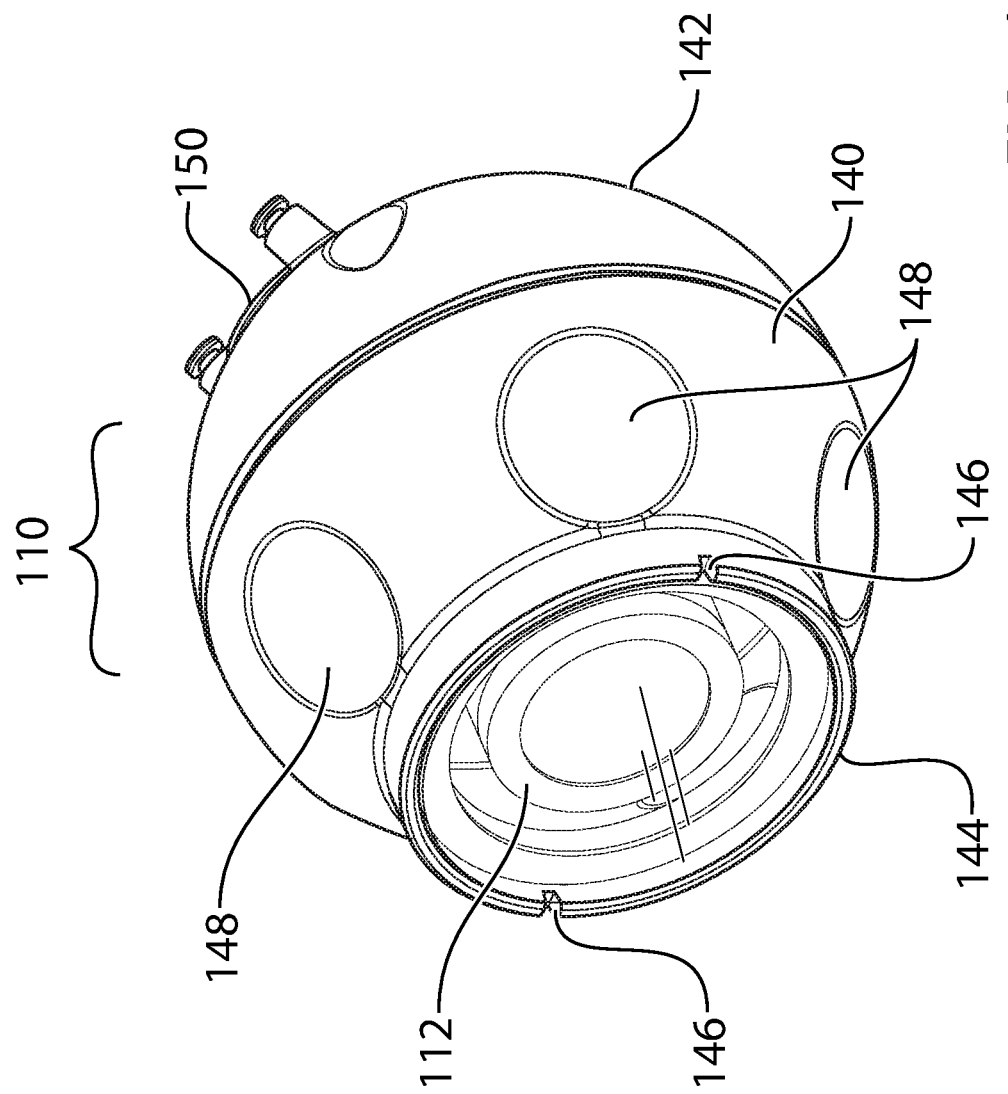
FIGS. 4(a) to (d) are perspective, front elevation, left side elevation and top plan views of an eyeball camera of the apparatus for use in both the first and second embodiments.
Figure 4B:
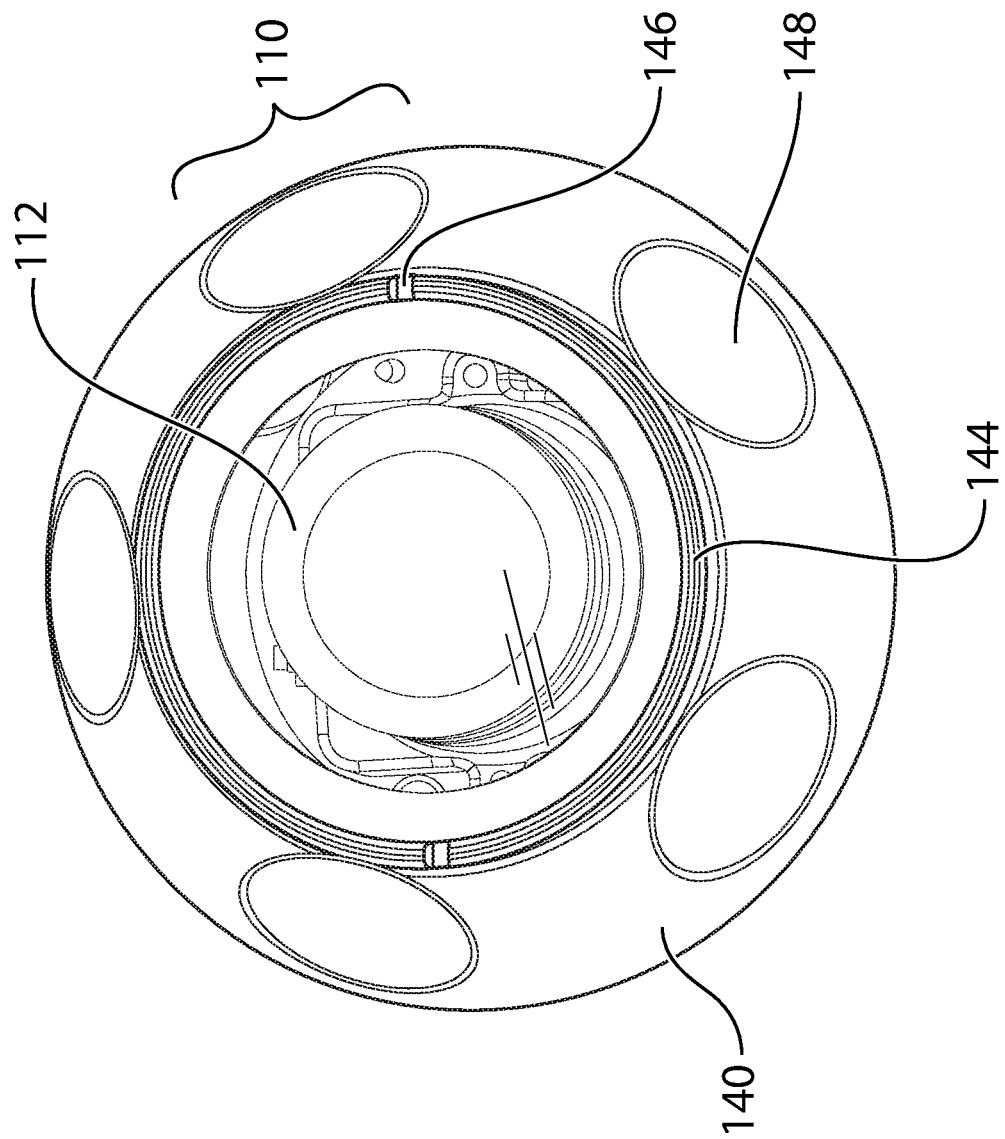
Figure 4C:
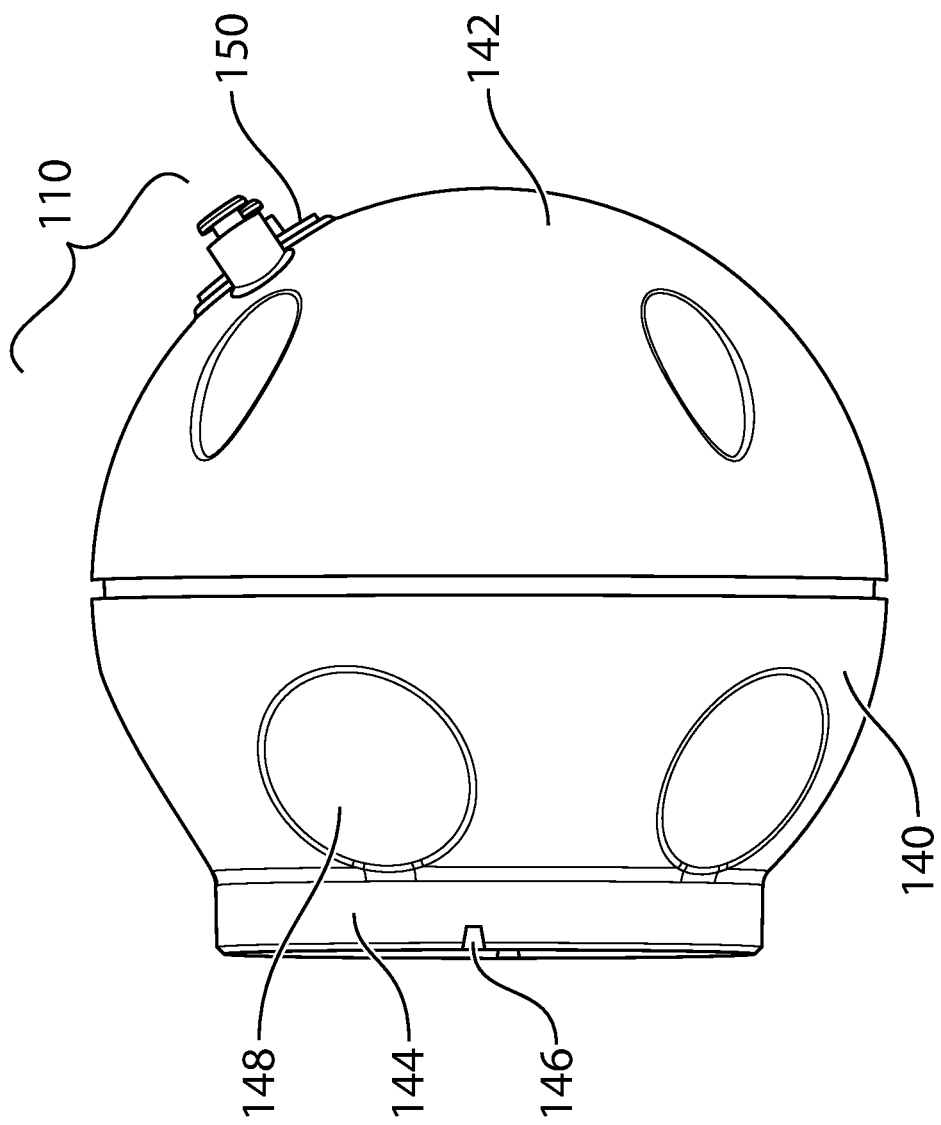
Figure 4D:
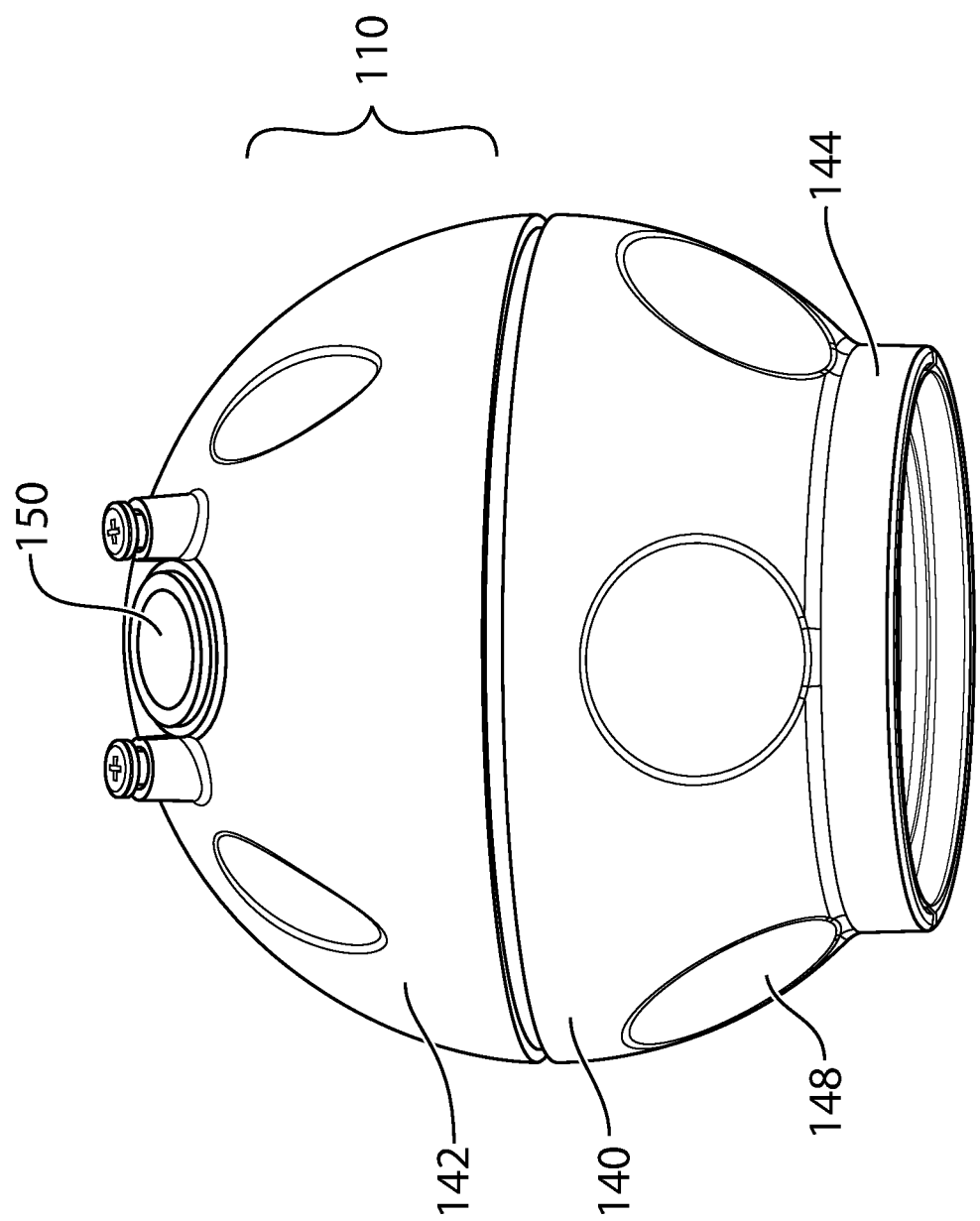

Referring now to FIGS. 3(*a*) and 3(*b*) the dome base 124 comprises a generally circular floor 126 and a generally cylindrical wall 128 that extends upwards from the floor 126, with a shallow cutout 130 at the front to receive the bottom part of the dome cover 108. The rim of the wall 128 features an annular ridge that engages with a corresponding annular ridge in the dome cover 108 thereby precisely locating the dome cover 108 on the dome base 124. A concave seat 132 is located near the front of the dome base 124 and has a curvature generally corresponding to the curvature of the eyeball camera 110; because of the generally spherical nature of the eyeball camera 110, the camera 110 can be seated on this seat 132 at multiple different orientations. The dome base 124 is further provided with a threaded screw hole 134 at the back and a tab hole 136 at the front; the dome cover 108 is secured to the dome base 124 by a locking tab on the cover 108 which engages the tab hole 136, and by a screw 138 which engages the threaded screw hole 134. Also, the dome base 124 is provided with a rear opening (not shown) through which the communications cable 106 extends into the dome base 124 and a bracket 139 which guides the cable 106 upwards into the rear portion of the dome base 124.

Referring now to FIGS. 4(*a*) to 4(*d*) and FIGS. 6(*b*) and 6(*c*), the eyeball camera 110 has a generally spherical shell comprised of a generally hemispherical front shell portion 140 and a generally hemispherical rear shell portion 142. The front shell portion comprises a rimmed circular lens opening 144 through which the lens 112 protrudes, as well as five dimples serving as finger grips 148 that allow a user to grasp and manipulate the eyeball camera 110. The rear shell portion comprises insets 141 for receiving screws (not shown) that connect to screw holes 143 securing the front and back shell portions together, and a communications port 150. The communications port 150 allows the communications cable 106 to connect to and communicate with electronics inside the eyeball camera 110. The communications port 150 is located on the upper part of the rear shell portion 140 to allow the cable 106 to be routed inside the dome cover 108 without interfering with movement of the eyeball camera 110. The front and rear shell portions 140, 142 connect to form a weather seal (e.g. with an o-ring) that impedes the entry of liquid, and the lens opening and communications port 150 are similarly sealed such that the electronics inside the eyeball camera 110 are protected and "weatherproofed".

Inside the eyeball camera 110 is a lens mount that is connected to an image sensor (both not shown). The communications cable 106 is electrically coupled to the image sensor via a connector, such as an I-PEX 20373-series connector, which is also used to couple the micro-coaxial cable 106 to the processing module 103 in the first embodiment (and to processing circuitry in the dome base 124 in the second embodiment). The image sensor, such as an Aptina™ AR0330 sensor, outputs a high-speed serial data stream along the micro-coaxial cable 106 using a data protocol such as the MIPI™ protocol. The micro-coaxial cable 106 is jacketed with thermoplastic polyurethane and includes fourteen conductors to facilitate high-speed serial communication. In alternative embodiments (not depicted), the micro-coaxial cable 106 may be manufactured using a different number of conductors or a different jacket material so long as communication between the processing module 103 and camera head 104 can be performed sufficiently quickly to transfer the video signal that the image sensor 126 outputs.

A pair of notches 146 are located on the rimmed opening 144 and provide an indication of the horizontal orientation of the eyeball camera; instead of notches, other markings can be provided such as protrusions, and instead of an indicated horizontal plane, notches or other markings can be provided to indicate any plane of the camera 110. Further, the five finger grips 148 are arranged equidistant around the front cover portion and such that one finger grip 148 is located directly above the lens 112 ("top finger grip") and provides an indicator of the top of the eyeball camera 110. These notches 146 and the top finger grip 148 are intended to provide the user with a relatively easy way to determine the orientation of the eyeball camera 110 when adjusting its aim.

Figure 5A:
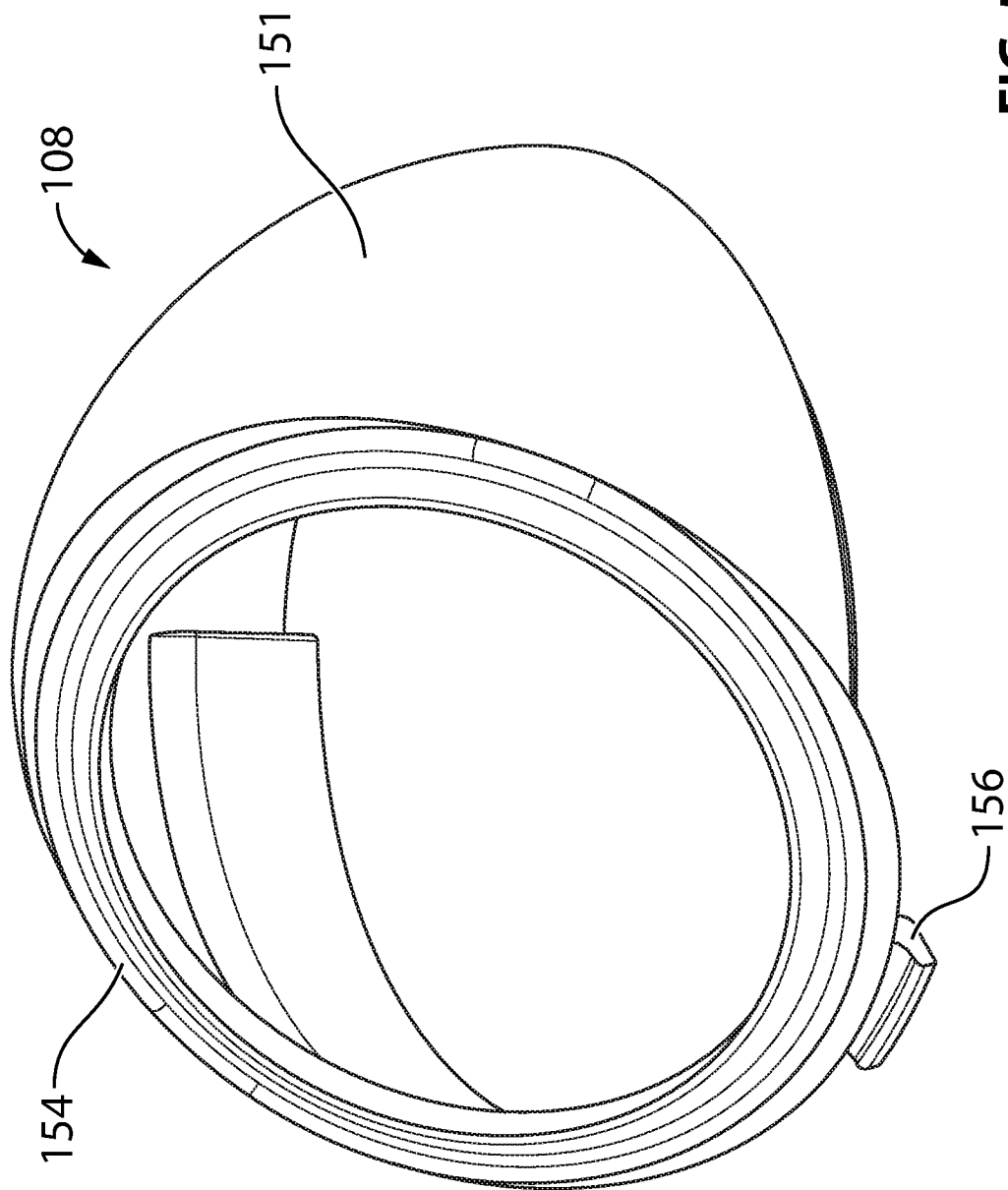
FIGS. 5(a) and (b) are respective upper and lower perspective views of a dome cover of the apparatus for use in both the first and second embodiments.
Figure 5B:
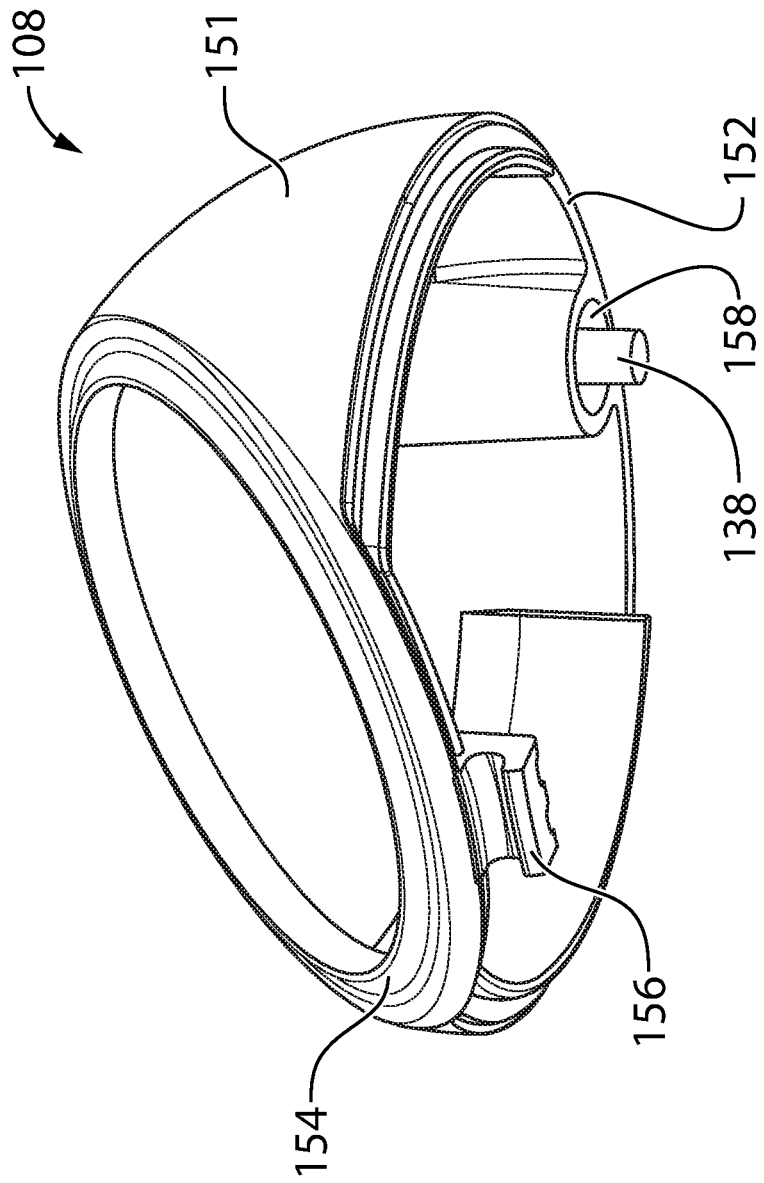

Referring now to FIGS. 5(*a*) and 5(*b*), the dome cover 108 has a generally spherically curved shell, with a circular bottom opening 152 that is configured to mount to the rim of the dome base wall 128, and a circular contact ring 154 defining a front opening having a diameter that is less than the eyeball camera diameter thus allowing the eyeball camera 110 to only partially protrude there-through. The bottom of the contact ring 154 protrudes slightly below the plane of the bottom opening 152 and the protruding portion is configured to seat within the curved cutout 130 in the wall 128 of the dome base 124. A locking tab 156 protrudes downwardly from the bottom of the contact ring 154 and is configured to engage the tab opening 136 of the dome base 124. A screw hole 158 is provided at the back of the shell 151 and is configured to receive the screw 138 and align with the screw hole 134 in the dome base 124 when the locking tab 156 engages the tab opening 136.

Figure 6A:
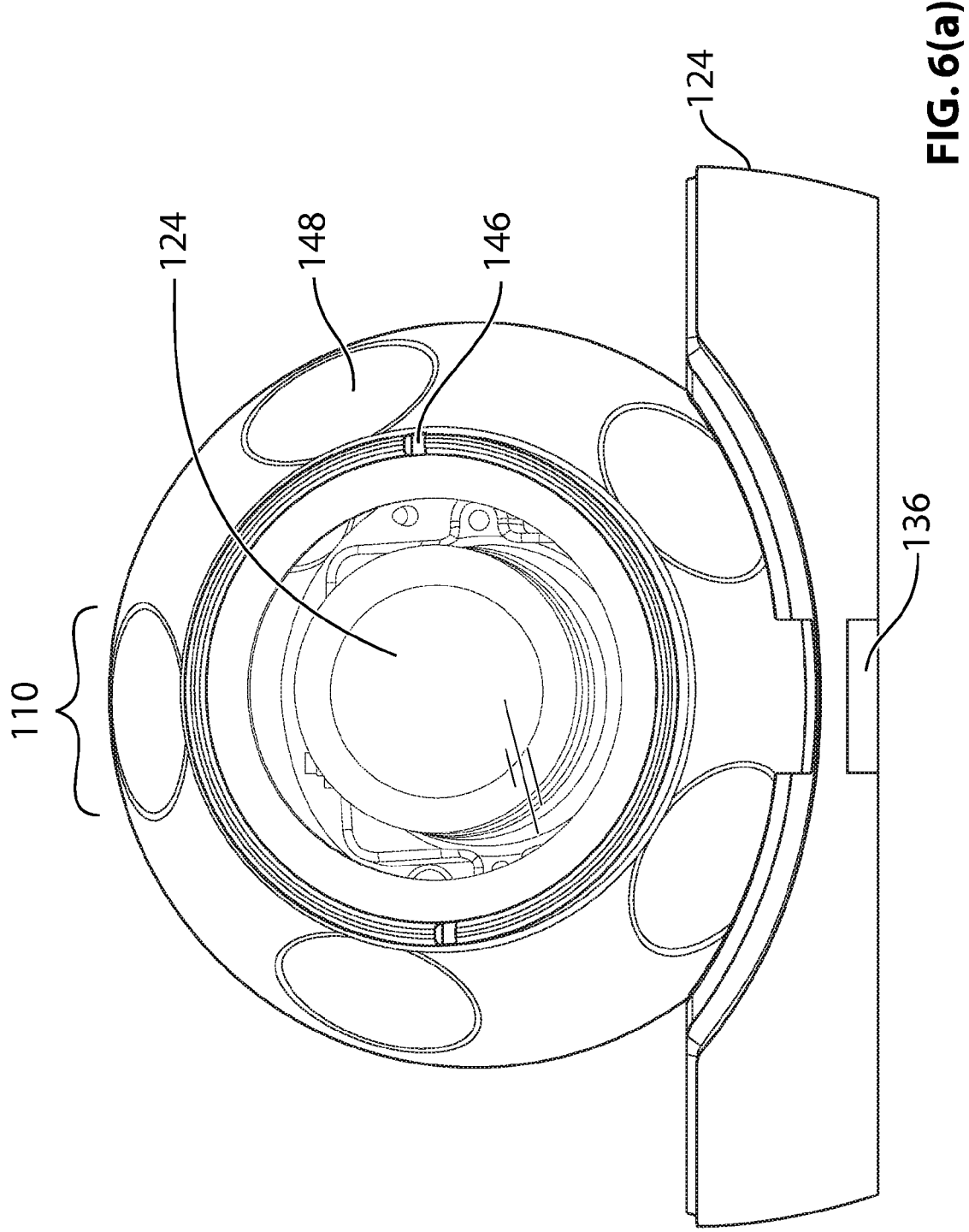
FIGS. 6(a) and (b) are front elevation and left side elevation views of the eyeball camera seated in the dome base for use in both the first and second embodiments.

The diameter of the contact ring 154 and its position on the dome cover 108 are selected such that an upper part of the contact ring 154 contacts the eyeball camera 110 when the dome cover 108 is mounted on the dome base 124 and is secured by the tab 156 and screw 138 and when the eyeball camera 110 is seated in the concave seat 132. The contact by the contact ring 154 exerts enough pressure on the eyeball camera 110 that it is fixed in place relatively securely inside the apparatus 100. As can be seen in FIGS. 6(a) and 6(b), the eyeball camera 110 when seated on the dome base 124 can be slideably rotated into different orientations, such that the lens 112 can be aimed in multiple different directions relative to the dome base 124. In this embodiment, the lens can be rotated within a range of about 86°; however, this rotational range can be changed by changing the dimensions of the eyeball camera 110 relative to the contact ring 154 and seat 132. Once a suitable orientation is selected, the dome cover 108 is mounted onto the dome base 124 and the eyeball camera 110 partially protrudes through the contact ring 154 until contact is made; when the dome cover 108 is secured in place via the tab 156 and screw 138, the eyeball camera 110 is also secured in place. In this sense, the cooperation of the contact ring 154 and the dome cover 108 with the concave seat 132 and the dome base 124 serves as an adjustable aiming mechanism for the eyeball camera 110. This aiming mechanism is external to the eyeball camera 110, i.e. the eyeball camera shell 140, 142 does not need to be breached to accommodate an aiming mechanism. This allows the eyeball camera 110 to maintain a weather seal to impede liquid from entering inside the camera, thus avoiding the expense and complication of engineering the dome cover 108 and dome base 124 to provide such a seal.

As can be seen in FIG. 6(b), the eyeball camera 110 is seated forward of the center of the dome floor 126 in order to provide enough room to accommodate a portion of the communications cable 106 inside the dome cover 108; this portion is long enough to provide enough slack in the communications cable 106 to allow the eyeball camera to rotate within the concave seat 132.

Figure 7D:
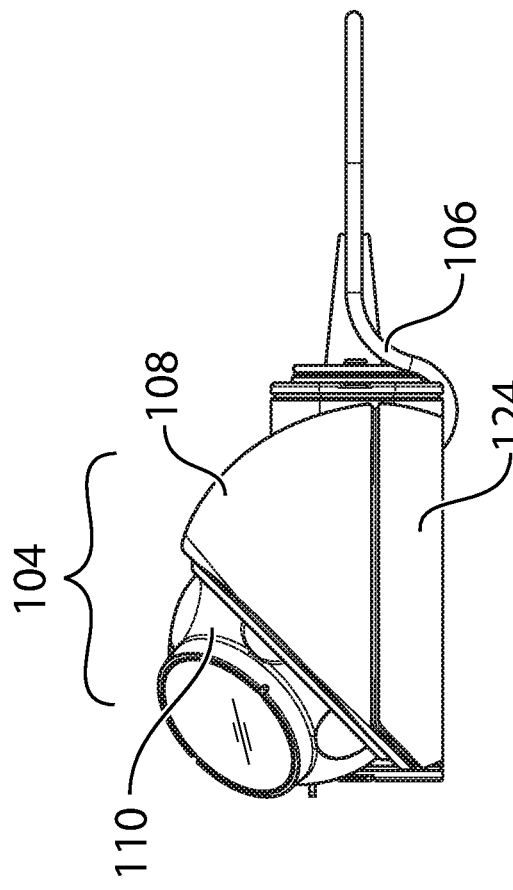
Figure 7C:
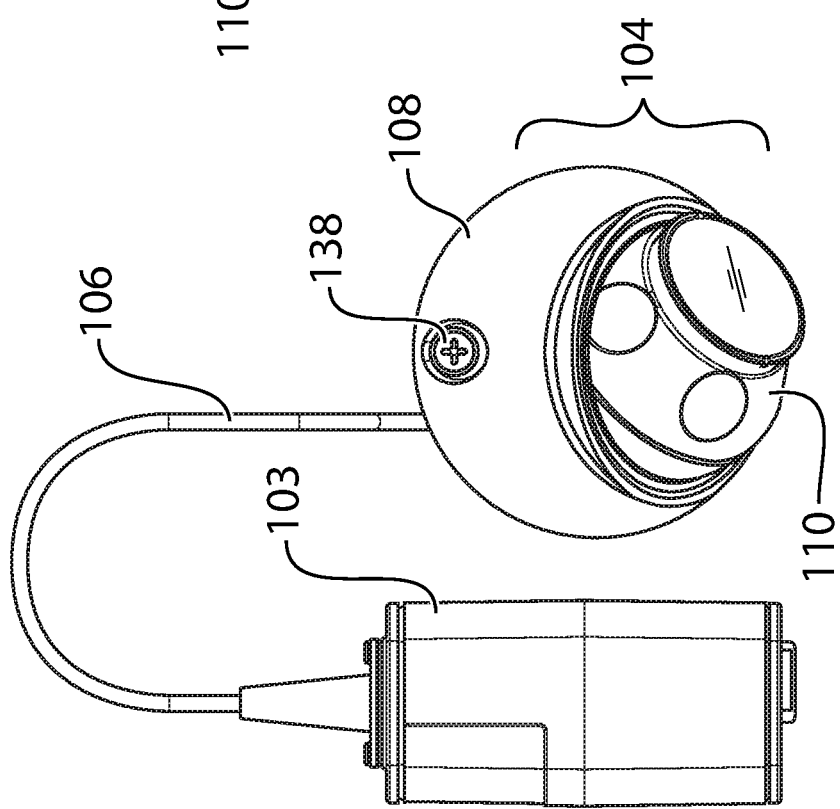
Figure 7F:
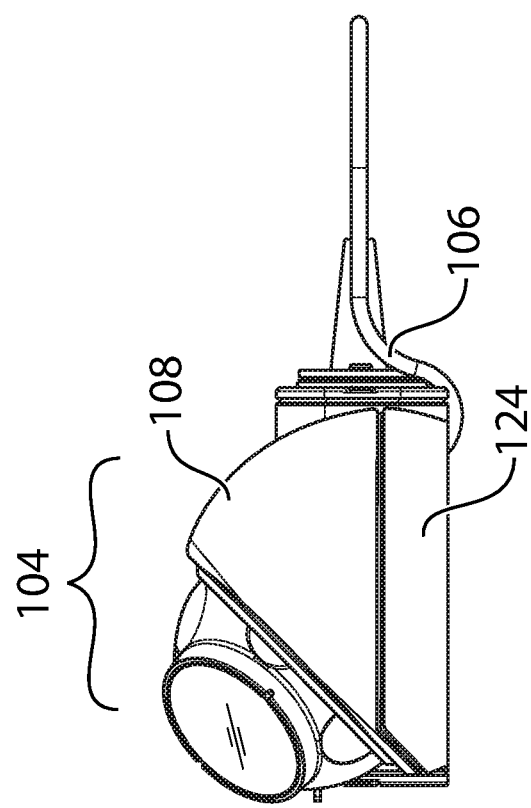
Figure 7E:
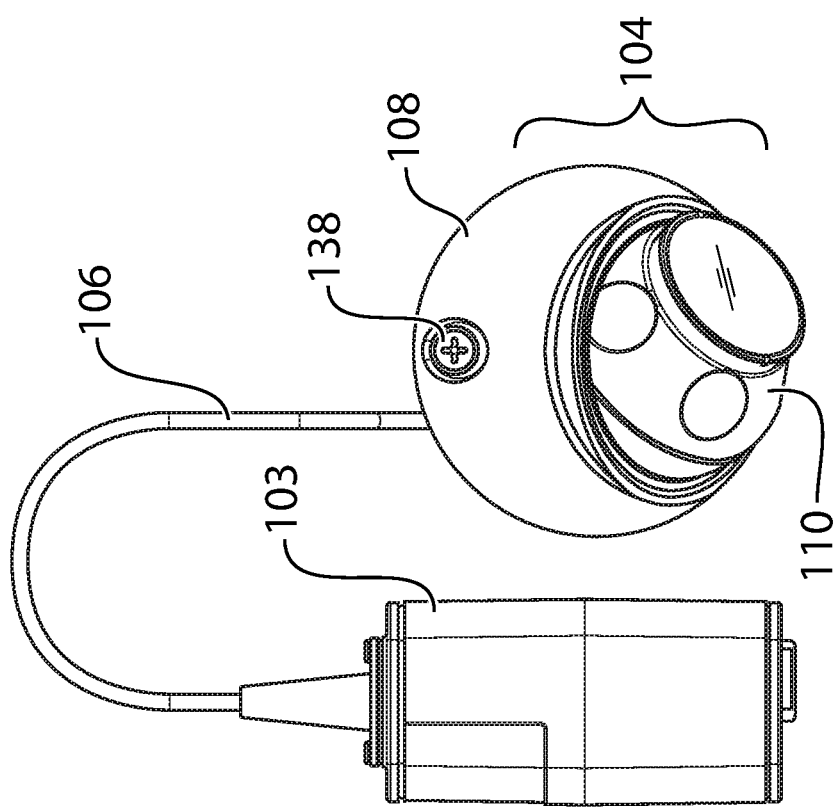

Referring now to FIGS. 7(a) to 7(f), the position (aiming) of the eyeball camera 110 relative to the rest of the apparatus 100 can be easily adjusted by a person. As can be seen in FIGS. 7(a) and 7(b), the dome cover 108 is loosened from the dome base 124 by partially unscrewing the screw 138. This will cause the rear of the dome cover to separate from the rim of the dome base 124 (the front of the dome cover 108 is still secured in place by the locking tab 154 engaged with the tab opening 136). The dome cover 108 is loosened enough that the eyeball camera 110 can be rotated relative to the rest of the apparatus 100 by the person grasping the dimples 148. As can be seen in FIGS. 7(c) and 7(d), the person moves the eyeball camera 110 into a desired position, then screws the screw 138 to tighten the dome cover 108 against the dome base 124. As can be seen in FIGS. 7(e) and 7(f), the screw is tightened until the dome cover 108 is fully seated on the dome base rim, and sufficient pressure is applied to the eyeball camera 100 that is fixed securely in place. Thus, the dome cover serves as an easily adjustable lens aiming mechanism for the eyeball camera 110.

As previously noted, the processing circuitry and electro-optics of a security camera apparatus can be located together inside a single unit instead of in a separate module 103 and camera head 104. Such an integrated camera apparatus 200 is shown in FIG. 2. In this second embodiment, the processing circuitry is located in the dome base 224. A communications cable (not shown) is coupled to the electro optics via the communications port on the camera 110 and to the electronics in the dome base 124 via a communications port on the dome base (not shown); this cable can be the same coaxial cable 106 used in the first embodiment, or a different cable. Except for the dome base being configured to receive the processing circuitry, the design of the integrated camera apparatus 200 is essentially the same as the camera head 104 of the first embodiment. In particular, the design of the concave seat (not shown), dome cover 208, eyeball camera 220 with dimples 248, and contact ring 244 are the same as the counterpart components in the first embodiment. It thus follows that the means for securing the eyeball camera 220 in place relative to the rest of the camera apparatus 200, and the method of adjusting the aim of the eyeball camera 200 is also the same as in the first embodiment.

In another embodiment (not shown), both the electro-optics and processing circuitry is housed in the camera 110 in which case there is no need for a separate communications cable.

In yet another embodiment (not shown), the security camera 100 features a housing having a cover and/or base with a different shape than a dome. The housing still comprises the circular contact ring 154 having a diameter that is less than that the diameter of the eyeball camera 110 and which allows the housing to serve as an adjustable lens aiming mechanism for the eyeball camera 110. The housing can partially or fully enclose the eyeball camera 110. The housing also has a bottom opening through allows the eyeball camera 110 to be seated on the base; this bottom opening can be circular like the embodiments shown in the Figures, or be another shape.

In yet another embodiment (not shown), the security camera 100 features an adjustable lens aiming mechanism (not shown) that does not enclose the eyeball camera 110, but still features the circular contact ring 154 having a diameter that is less than the diameter of the eyeball camera 110. The lens aiming mechanism further comprises a mount for attaching the contact ring to the base; this mount can be a ring that has an opening large enough for the eyeball camera 110 to be seated on the base.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:
1. A security camera apparatus comprising:
(a) a base comprising an eyeball camera seat;
(b) an eyeball camera having a lens and being movably seated on the eyeball camera seat;
(c) a lens aiming mechanism comprising a mount mountable to the base, a circular contact ring connected to the mount and having a diameter smaller than the eyeball camera diameter and defining an opening through which the lens and a portion of the eyeball camera protrudes;
(d) a fastener removably fastening the lens aiming mechanism to the base such that when fully fastened, the contact ring makes contact with the eyeball camera and applies a sufficient pressure to fix the eyeball camera in place on the seat, and when partially or completely unfastened, the pressure is reduced such that the eyeball camera is movable on the seat and the lens is movable within the contact ring; and
wherein the lens aiming mechanism comprises a cover which at least partially covers the eyeball camera, wherein the mount has a bottom opening in the cover, the contact ring is located at a front part of the cover, and the fastener is connected to the cover.

2. An apparatus as claimed in claim 1 wherein the cover is a dome cover and the base is a circular dome base.

3. An apparatus as claimed in claim 1 wherein the protruding portion of the eyeball camera comprises markings indicating an imaging plane of interest.

4. An apparatus as claimed in claim 3 wherein the markings are notches or protrusions on a rimmed opening encircling the lens and the indicated imaging plane is a horizontal plane.

5. An apparatus as claimed in claim 1 wherein the protruding portion of the eyeball camera comprises at least one finger grip.

6. An apparatus as claimed in claim 5 wherein the eyeball camera comprises multiple finger grips including one finger grip on a protruding portion of the eyeball camera located above the lens to indicate the top of an image taken by the eyeball camera.

7. An apparatus as claimed in claim 2 wherein the eyeball camera contains electro-optics and comprises a communications port and the apparatus further comprises a processing module containing processing circuitry and a communications cable coupling the processing module to the communications port on the eyeball camera, and the dome base further comprises a cable opening for routing the cable into the dome base.

8. An apparatus as claimed in claim 7 wherein the seat is located in a forward portion of the dome base and the eyeball camera and dome cover are sized such that a space is provided inside the dome cover to receive a sufficient length of communications cable to allow the eyeball camera to be rotated about a defined range on the seat.

9. An apparatus as claimed in claim 2 wherein the eyeball camera contains electro-optics and comprises a communications port and the dome base contains processing circuitry and comprises a communications port, and the apparatus further comprises a communications cable coupled to the communications ports of the eyeball camera and the dome base.

10. An apparatus as claimed in claim 9 wherein the seat is located in a forward portion of the dome base and the eyeball camera and dome cover are sized such that a space is provided inside the dome cover to receive a sufficient length of communications cable to allow the eyeball camera to be rotated about a defined range on the seat.

11. An apparatus as claimed in claim 1 wherein the eyeball camera contains electro-optics and processing circuitry.

12. An apparatus as claimed in claim 2 wherein the fastener comprises a locking tab on the dome cover and a tab opening on the dome base, and a screw and screw holes in the dome cove and dome base to fixedly receive the screw.

13. An apparatus as claimed in claim 1 wherein the eyeball camera comprises a weatherproof shell comprising a lens opening and a communications port that are both sealed to impede water from entering into the eyeball camera.

14. A method for adjusting an eyeball camera lens position on a security camera apparatus comprising: a base comprising an eyeball camera seat; an eyeball camera having a lens and being movably seated on the eyeball camera seat; a lens aiming mechanism comprising a mount mountable to the base, a circular contact ring connected to the mount and having a diameter smaller than the eyeball camera diameter and defining an opening through which the lens and a portion of the eyeball camera protrudes; and a fastener removably fastening the lens aiming mechanism to the base, the method comprising:
  (a) at least partially covering the eyeball camera with the lens aiming mechanism;
  (b) partially or completely unfastening the fastener from the base such that the eyeball camera is movable on the seat and the lens is moveable within the contact ring;
  (c) moving the lens to a desired position; and
  (d) fully fastening the fastener to the base such that the lens aiming mechanism applies sufficient pressure to fix the eyeball camera in place on the seat.

15. A method as claimed in claim 14 wherein the protruding portion of the eyeball camera comprises markings indicating an imaging plane of eyeball camera, and the method further comprises moving the eyeball camera such that the markings are aligned with an imaging plane of interest.

16. A method as claimed in claim 15 wherein the markings are notches or protrusions on a rimmed opening encircling the lens and the indicated imaging plane is a horizontal plane, and the method further comprises moving the eyeball camera such that the indicated imaging plane is horizontally aligned with an external reference point.

17. A method as claimed in claim 14 wherein the protruding portion of the eyeball camera comprises at least one finger grip and the method comprises moving the lens by gripping the at least one finger grip.

18. A method as claimed in claim 17 wherein the eyeball camera comprises multiple finger grips including one finger grip on a protruding portion of the eyeball camera located above the lens to indicate the top of an image taken by the eyeball camera, and the method comprises moving the lens by gripping at least one of the finger grips such that the finger grip located above the lens is vertically aligned with an external reference point.

* * * * *